(12) United States Patent
Takaki (10) Patent No.: US 8,965,381 B2
(45) Date of Patent: Feb. 24, 2015

(54) WIRELESS COMMUNICATION SYSTEM, MOBILE TERMINAL, AND CELL SEARCH METHOD

(75) Inventor: Tetsuya Takaki, Tokyo (JP)

(73) Assignee: Lenovo Innovations Limited (Hong Kong), Quarry Bay (HK)

( * ) Notice: Subject to any disclaimer, the term of this patent is extended or adjusted under 35 U.S.C. 154(b) by 0 days.

(21) Appl. No.: 13/513,901

(22) PCT Filed: Nov. 2, 2010

(86) PCT No.: PCT/JP2010/069491
§ 371 (c)(1),
(2), (4) Date: Jun. 5, 2012

(87) PCT Pub. No.: WO2011/070875
PCT Pub. Date: Jun. 16, 2011

(65) Prior Publication Data
US 2012/0244867 A1    Sep. 27, 2012

(30) Foreign Application Priority Data
Dec. 7, 2009 (JP) ................................. 2009-277557

(51) Int. Cl.
*H04W 36/00* (2009.01)
*H04W 36/18* (2009.01)
(Continued)

(52) U.S. Cl.
CPC .............. *H04W 36/18* (2013.01); *H04W 8/005* (2013.01); *H04W 8/26* (2013.01); *H04W 36/04* (2013.01); *H04W 36/08* (2013.01); *H04W 88/02* (2013.01); *H04W 88/08* (2013.01)
USPC ........... 455/444; 455/436; 370/328; 370/331; 370/338

(58) Field of Classification Search
USPC ............ 455/436–444, 41.1–41.3, 456.1–457, 455/426.1, 552.1, 553.1; 370/338, 254, 370/255, 256, 328, 331
See application file for complete search history.

(56) References Cited

U.S. PATENT DOCUMENTS

2008/0081623 A1* 4/2008 Burgan et al. .................. 455/436
2009/0098873 A1* 4/2009 Gogic ............................ 455/436
(Continued)

FOREIGN PATENT DOCUMENTS

| CN | 101175328 A | 5/2008 |
|---|---|---|
| JP | 11-234760 | 8/1999 |
| JP | 2009-225039 | 10/2009 |

OTHER PUBLICATIONS

International Search Report, PCT/JP2010/069491, issued Jan. 11, 2011.
(Continued)

*Primary Examiner* — Daniel Lai
(74) *Attorney, Agent, or Firm* — Young & Thompson (57) ABSTRACT

A mobile terminal includes: a macrocell search unit which searches for a macro base station, the mobile terminal itself communicating with a macro base station forming a macrocell or a femto base station which forms a femtocell; a cell ID detection unit which receives report information from the macro base station searched by the macrocell search unit and detects a cell ID of the macro base station; a cell ID information storage unit which stores the cell ID of the macro base station; a cell ID comparison unit which compares the cell ID stored in the cell ID information storage unit with the cell ID detected by the cell ID detection unit; a control unit controlling the macrocell search unit, the cell ID detection unit, the macrocell search unit, and the cell ID comparison unit; and a femtocell search unit which performs a cell search for the femto base station.

9 Claims, 5 Drawing Sheets

(51) Int. Cl.
*H04W 8/00* (2009.01)
*H04W 8/26* (2009.01)
*H04W 36/04* (2009.01)
*H04W 36/08* (2009.01)
*H04W 88/02* (2009.01)
*H04W 88/08* (2009.01)

(56) References Cited

U.S. PATENT DOCUMENTS

2009/0163216 A1 6/2009 Hoang
2009/0247170 A1* 10/2009 Balasubramanian et al. 455/445
2010/0008323 A1* 1/2010 Deshpande et al. .......... 370/331
2010/0267386 A1* 10/2010 Lim et al. ...................... 455/436
2011/0021197 A1* 1/2011 Ngai .............................. 455/436

OTHER PUBLICATIONS

Chinese Office Action dated Apr. 18, 2014; Application No. 201080055270.2.

* cited by examiner

WIRELESS COMMUNICATION SYSTEM, MOBILE TERMINAL, AND CELL SEARCH METHOD

TECHNICAL FIELD

The present invention relates to a wireless communication system which includes femtocells, a mobile terminal, and a cell search method.

BACKGROUND ART

In recent years, as the rapid extension of the mobile phone market, mobile phone providers, which provide mobile phone services, have been deployed base stations of macrocells to extend the cover area of the mobile phone services. However, the mobile phone services are provided using radio electric waves. For this reason, for example, there has been a problem in that deployment of the base stations is restricted in areas such as indoor areas and upper floors of high-rise buildings. In addition, there has been a problem in that there are blind areas of electric waves due to the property of the radio electric waves and thus sufficient services cannot be provided.

In order to solve these problems, in recent years, removal of the blind areas is being advanced using femtocells (for example, Patent Document 1). The femtocells refer to cells formed by miniature base stations that can be deployed in homes, companies, or the like by users. A femtocell can cover a small area having a radius of several tens of meters. However, since there are little restrictions on the deployed location, the miniature base stations can be deployed in buildings, at which electric waves do not arrive easily, underground shopping centers, the inside of houses, and upper floors. For this reason, there is an advantage in that the users can enjoy mobile phone services in finely prepared areas. In addition, it is advantageous to communication providers that, for example, costs for constructing and operating base stations of macrocells can be reduced, and load on macrocell networks can be mitigated.

PRIOR ART DOCUMENT

Patent Document

Patent Document 1: Japanese Unexamined Patent Application, First Publication No. 2009-225039

SUMMARY OF INVENTION

Problems to be Solved by the Invention

However, locations where miniature base stations forming femtocells are deployed are mainly general houses, and a main purpose thereof is to provide services to residents of the houses. For this reason, the femtocells and macrocells are operated differently. Specifically, the macrocells are operated using neighboring cell information that does not include information on the femtocells. As a result, if a mobile terminal is moved from a macrocell to a femtocell, it was required that transition is made to the state in which the mobile terminal is temporarily out of range and then the mobile terminal registers the location with the femtocell again. For this reason, there has been a problem in that the user's convenience is damaged; for example, if movement from a macrocell to a femtocell is performed when a user is making a call, the call is interrupted.

In view of the above problems, an exemplary object of the present invention is to provide a wireless communication system, a mobile terminal, and a cell search method that realize a smooth inter-cell movement without transition to the state in which a mobile terminal is out of range even if movement from a macrocell to a femtocell is performed.

Means for Solving the Problems

The present invention has been made in order to solve the foregoing problems, and a mobile terminal of the present invention includes: a macrocell search unit which searches for a macro base station with which the mobile terminal itself is capable of communicating, the mobile terminal itself communicating with a macro base station which forms a macrocell or a femto base station which forms a femtocell; a cell ID detection unit which receives report information from the macro base station searched by the macrocell search unit and detects a cell ID of the macro base station; a cell ID information storage unit which stores the cell ID of the macro base station; a cell ID comparison unit which compares the cell ID stored in the cell ID information storage unit with the cell ID detected by the cell ID detection unit; a control unit which, if reception quality from a femto base station that the mobile terminal is present in the range thereof is lower than a predetermined threshold, directs the macrocell search unit to search for the macro base station, directs the cell ID detection unit to detect the cell ID, stores the detected cell ID in the cell ID information storage unit, and, whenever the mobile terminal undergoes an inter-cell movement, directs the macrocell search unit to search for the macro base station, directs the cell ID detection unit to detect the cell ID, and directs the cell ID comparison unit to compare the cell IDs; and a femtocell search unit which performs a cell search for the femto base station based on a comparison result between the cell ID stored in the cell ID information storage unit and the detected cell ID.

In addition, a wireless communication system of the present invention includes a mobile terminal which communicates with a macro base station which forms a macrocell or a femto base station which forms a femtocell, wherein the mobile terminal includes: a macrocell search unit which searches for a macro base station with which the mobile terminal is capable of communicating; a cell ID detection unit which receives report information from the macro base station searched by the macrocell search unit and detects a cell ID of the macro base station; a cell ID information storage unit which stores the cell ID of the macro base station; a cell ID comparison unit which compares the cell ID stored in the cell ID information storage unit with the cell ID detected by the cell ID detection unit; a control unit which, if reception quality from a femto base station that the mobile terminal is present in the range thereof is lower than a predetermined threshold, directs the macrocell search unit to search for the macro base station, directs the cell ID detection unit to detect the cell ID, stores the detected cell ID in the cell ID information storage unit, and, whenever the mobile terminal undergoes an inter-cell movement, directs the macrocell search unit to search for the macro base station, directs the cell ID detection unit to detect the cell ID, and directs the cell ID comparison unit to compare the cell IDs; and a femtocell search unit which performs a cell search for the femto base station based on a comparison result between the cell ID stored in the cell ID information storage unit and the detected cell ID.

In addition, a cell search method of the present invention includes: searching for a macro base station with which a mobile terminal is capable of communicating, if reception quality from a femto base station that the mobile terminal is present in the range thereof is lower than a predetermined threshold, the mobile terminal communicating with a macro base station which forms a macrocell or a femto base station which forms a femtocell; receiving report information from the searched macro base station, detecting a cell ID of the macro base station, and storing the detected cell ID; whenever the mobile terminal undergoes an inter-cell movement, searching for a macro base station with which the mobile terminal is capable of communicating, and comparing a cell ID detected from report information received from the searched macro base station with the stored cell ID; and performing a cell search for the femto base station based on a comparison result between the stored cell ID and the detected cell ID.

Effects of the Invention

In accordance with the present invention, if a mobile terminal is moved in the vicinity of a boundary which is out of the range of a femtocell, the mobile terminal receives report information from neighboring macrocells, detects cell IDs of the macrocells from the report information that can be received at that time, and stores the detected cell IDs in the cell ID information storage unit. Then, whenever the mobile terminal undergoes an inter-cell movement, the mobile terminal receives report information from neighboring macrocells to detect cell IDs of the macrocells, compares the cell IDs stored in the cell ID information storage unit with the detected cell IDs, and performs a cell search for a femto base station based on the comparison result. By doing so, movement from a macrocell to a femtocell is possible without transition to the state in which the mobile terminal is out of range. As a result, even if, for example, a user moves from the macrocell to the femtocell during communications using the mobile terminal, the communications are not interrupted and it is possible to maintain satisfactory communications.

MODE(S) FOR CARRYING OUT THE INVENTION

Hereinafter, exemplary embodiments of the present invention will be described with reference to the drawings.

First Exemplary Embodiment

Figure 1:
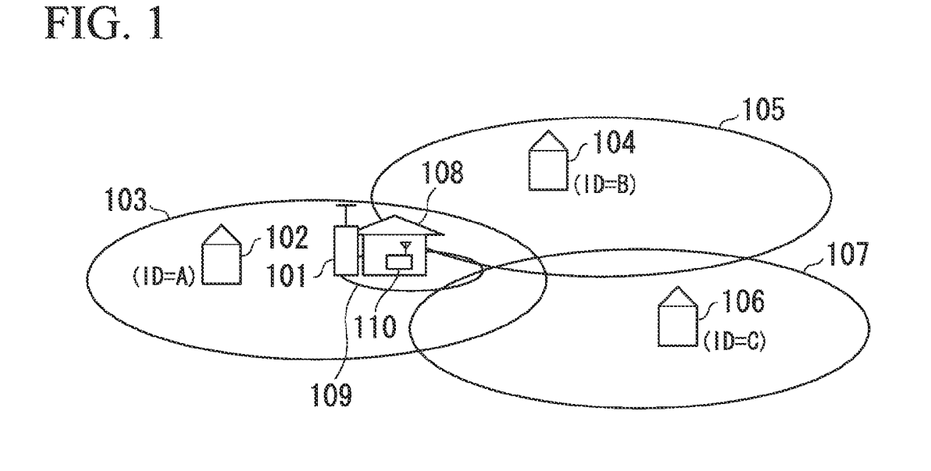
FIG. 1 is a block diagram showing a wireless communication system in accordance with a first exemplary embodiment of the present invention.

FIG. 1 is a block diagram showing a wireless communication system in accordance with a first exemplary embodiment of the present invention.

As shown in FIG. 1, in the wireless communication system in accordance with the first exemplary embodiment of the present invention, there are provided three base stations (macro base stations which form macrocells) including a base station 102, a base station 104, and a base station 106, and a miniature base station (a femto base station which forms a femtocell) 110 for the femtocell. The base station 102 covers a macrocell 103. The base station 104 covers a macrocell 105. The base station 106 covers a macrocell 107. In addition, the miniature base station 110 for the femtocell is deployed in a house 108, and covers a femtocell 109 having a small area in the vicinity of the house 108.

It is to be noted that in order to simplify the explanation, FIG. 1 shows an exemplary wireless communication system which is provided with three base stations including the base station 102, the base station 104, and the base station 106, and one miniature base station 110 for a femtocell. However, as a matter of fact, a plurality of base stations and/or a plurality of miniature base stations for femtocells are further provided in the wireless communication system.

In FIG. 1, different cell IDs (identifiers) are assigned to the base station 102, the base station 104, and the base station 106, respectively. Herein, it is assumed that the cell ID of the base station 102 is A (ID=A), the cell ID of the base station 104 is B (ID=B), and the cell ID of the base station 106 is C (ID=C). In addition, report information reported from each of the base station 102, the base station 104, and the base station 106 includes their own cell IDs.

A mobile terminal 101 communicates voice and/or data with the base station 102, the base station 104, and the base station 106, which the mobile terminal 101 is present in their ranges. In addition, if the mobile terminal 101 is present in the range of the femtocell 109, the mobile terminal 101 performs wireless communications of voice and/or data with the miniature base station 110 for the femtocell. Herein, it is assumed that a user of the mobile terminal 101 resides in the house 108.

Figure 2:
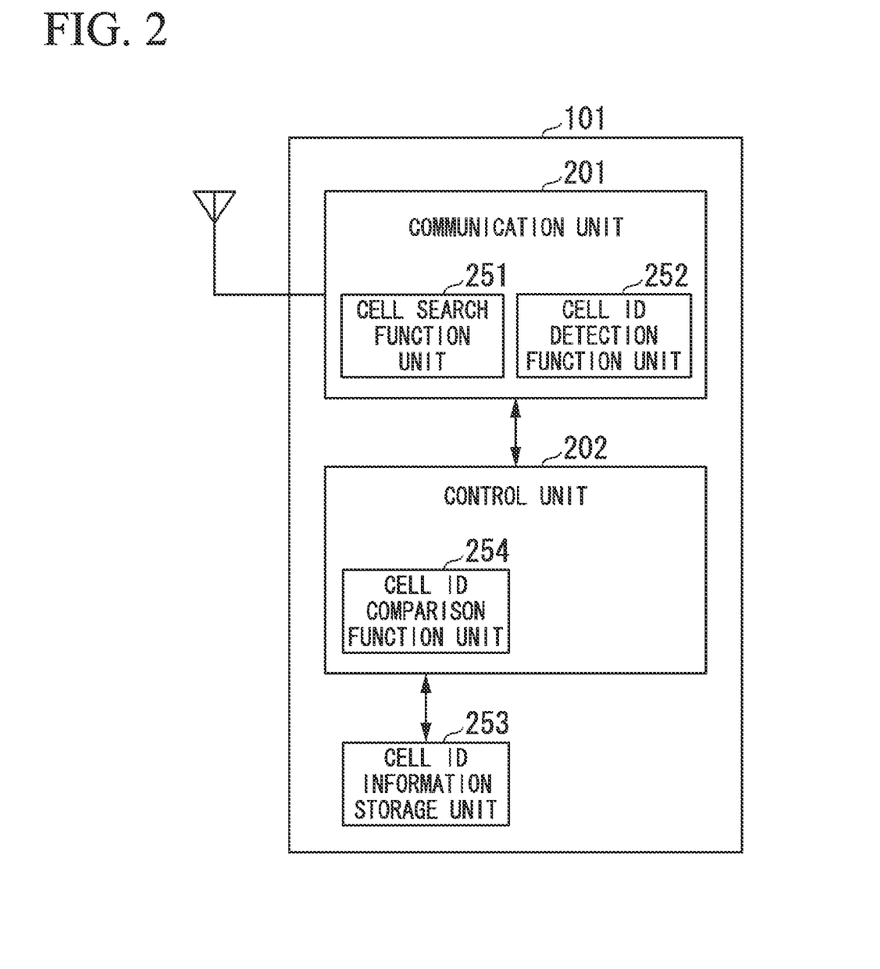
FIG. 2 is a block diagram showing a configuration of a mobile terminal in the wireless communication system in accordance with the first exemplary embodiment of the present invention.

FIG. 2 is a block diagram showing a configuration of the mobile terminal 101. As shown in FIG. 2, the mobile terminal 101 includes a communication unit 201 and a control unit 202. The communication unit 201 performs wireless communications of voice and/or data with base stations. The communication unit 201 includes: a cell search function unit 251 which performs a cell search to search for base stations with which the mobile terminal 101 can communicate; and a cell ID detection function unit 252 which receives report information from a base station and detects a cell ID included in the received report information. The control unit 202 controls respective units in the mobile terminal 101. Moreover, the control unit 202 includes a cell ID comparison function unit 254. Furthermore, the mobile terminal 101 includes a cell ID information storage unit 253. The control unit 202 registers cell ID information with the cell ID information storage unit 253 and reads the cell ID information from the cell ID information storage unit 253.

FIG. 3A to FIG. 3D are diagrams explaining processes at respective locations when the mobile terminal 101 is moved.

Figure 4A:
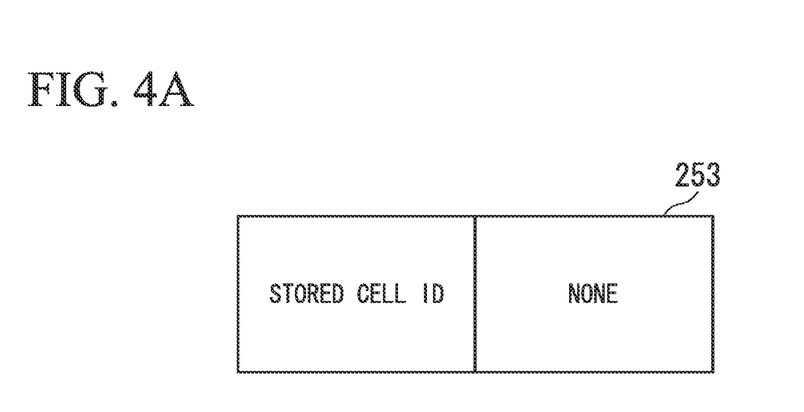
FIG. 4A is a diagram explaining a cell ID that is stored in a cell ID information storage unit in the wireless communication system in accordance with the first exemplary embodiment of the present invention.
Figure 4B:
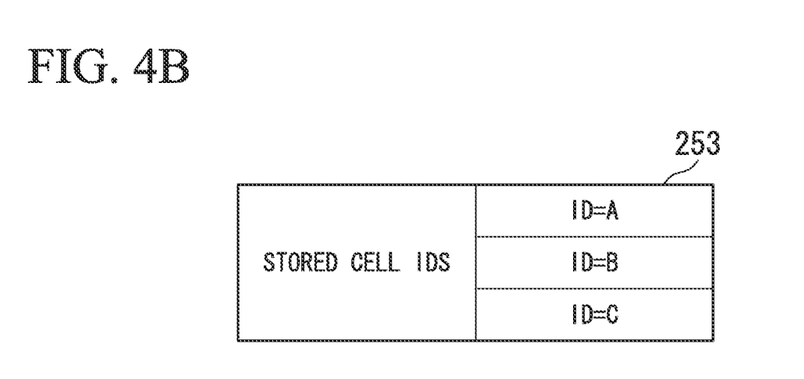
FIG. 4B is a diagram explaining cell IDs that are stored in the cell ID information storage unit in the wireless communication system in accordance with the first exemplary embodiment of the present invention.

FIG. 4A and FIG. 4B are diagrams showing information stored in the cell ID information storage unit 253.

Figure 3A:
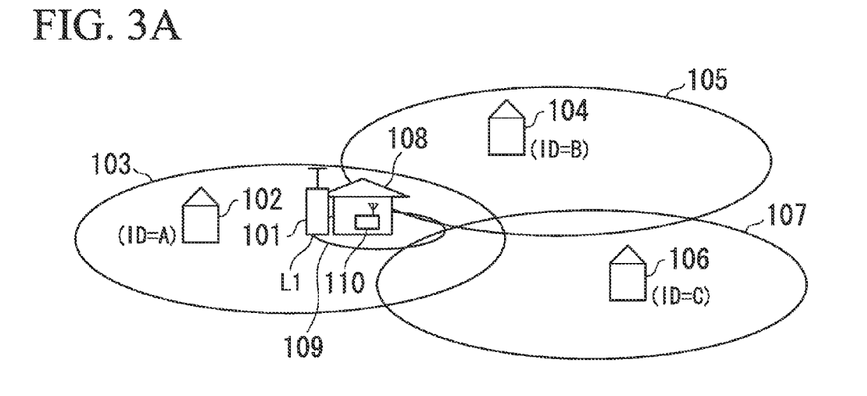
FIG. 3A is a diagram explaining a process at each location when a mobile terminal is moved in the wireless communication system in accordance with the first exemplary embodiment of the present invention.

As shown in FIG. 3A, if the mobile terminal 101 is present at a location L1 in the vicinity of the house 108 (a location which is in the ranges of the macrocell 103 and the femtocell 109, and is out of the ranges of the macrocell 105 and the macrocell 107), the mobile terminal 101 is present in the range of the femtocell 109 and communicates with the miniature base station 110 for the femtocell. It is to be noted that in an initial state, no cell ID information is stored in the cell ID information storage unit 253 of the mobile terminal 101, as shown in FIG. 4A.

Figure 3B:
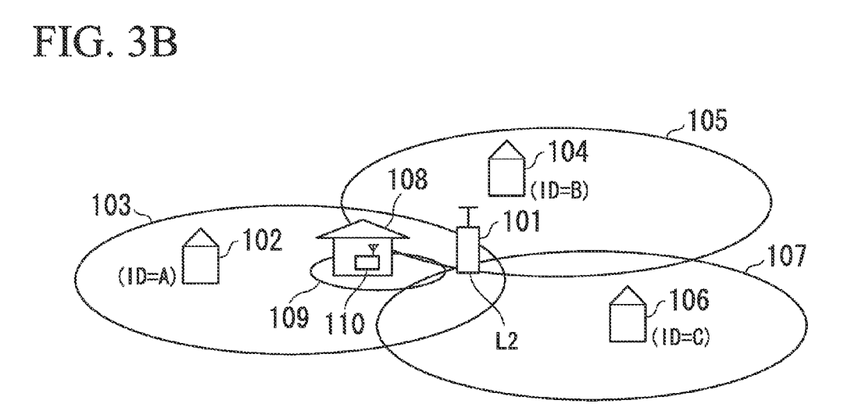
FIG. 3B is a diagram explaining a process at each location when the mobile terminal is moved in the wireless communication system in accordance with the first exemplary embodiment of the present invention.

As shown in FIG. 3B, if the mobile terminal 101 is moved to the outside of the range of the femtocell 109 as a result of going out of the user, the reception quality of signals from the femtocell 109 that are received by the mobile terminal 101 is deteriorated. For this reason, if the mobile terminal 101 is moved to a boundary location L2 of the femtocell 109 (a location which is out of the range of the femtocell 109 and is in the ranges of the macrocell 103, the macrocell 105, and the macrocell 107), the reception quality is lower than a predetermined threshold with which satisfactory communications are possible. If the reception quality from the femtocell 109 is lower than the predetermined threshold, the cell search function unit 251 of the mobile terminal 101 executes a cell search. If the mobile terminal 101 is present at the location L2, the mobile terminal 101 executes a cell search to detect the macrocell 103, the macrocell 105, and the macrocell 107, and registers the location with a macrocell that provides the best reception quality among the macrocell 103, the macrocell 105, and the macrocell 107.

In addition, at this time, the mobile terminal 101 receives report information reported from each of the base station 102, the base station 104, and the base station 106, and stores the cell ID (ID=A) of the macrocell 103, the cell ID (ID=B) of the macrocell 105, and the cell ID (ID=C) of the macrocell 107, for which the report information has been received successfully, in the cell ID information storage unit 253 provided in the mobile terminal 101, as shown in FIG. 4B.

In this way, the mobile terminal 101 receives the cell IDs from the base station 102, 104, and 106 at the location L2, which is out of the range of the femtocell 109 and is in the vicinity of the boundary, and stores the cell IDs (ID=A, ID=B, and ID=C), which have been received successfully, in the cell ID information storage unit 253 provided in the mobile terminal 101. If the mobile terminal 101 undergoes an inter-cell movement after having stored the cell IDs in the cell ID information storage unit 253, the mobile terminal 101 collates the cell IDs stored in the cell ID information storage unit 253 with received cell IDs to perform a process of checking agreement or disagreement of the cell IDs whenever it undergoes the inter-cell movement. Then, if the mobile terminal 101 has determined that the cell IDs stored in the cell ID information storage unit 253 exactly agree with the received cell IDs, the mobile terminal 101 performs a cell search for the femtocell 109.

Figure 3C:
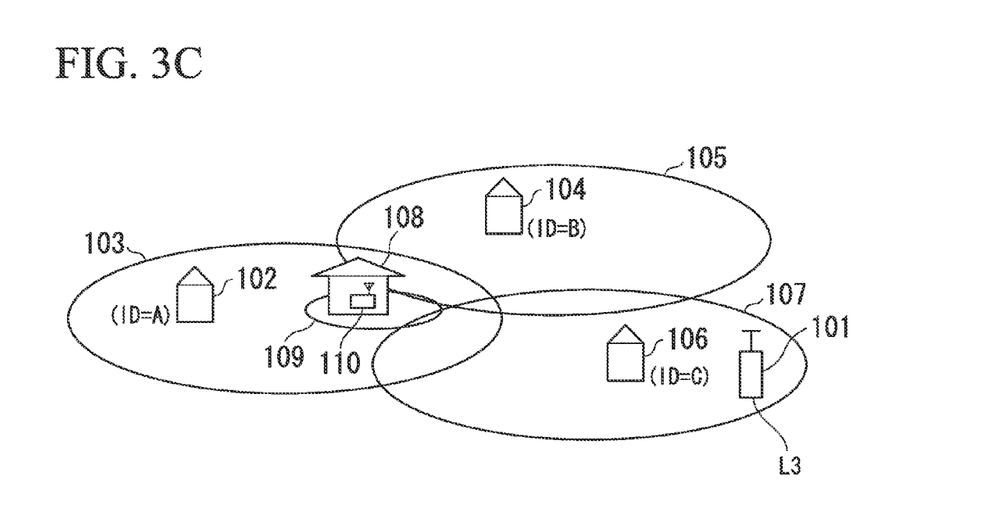
FIG. 3C is a diagram explaining a process at each location when the mobile terminal is moved in the wireless communication system in accordance with the first exemplary embodiment of the present invention.

For example, as shown in FIG. 3C, it is assumed that the mobile terminal 101 is moved to a location L3, which is distant from the femtocell 109 (a location which is in the range of the macrocell 107 and is out of the ranges of the macrocell 103, the macrocell 105, and the femtocell 109). In this case, the mobile terminal 101 receives only the cell ID (ID=C) of the macrocell 107. At this time, the cell IDs (ID=A, ID=B, and ID=C) (see FIG. 4B) stored in the cell ID information storage unit 253 do not exactly agree with the received cell ID (ID=C). Therefore, in this case, the mobile terminal 101 does not perform a cell search for the femtocell 109.

Figure 3D:
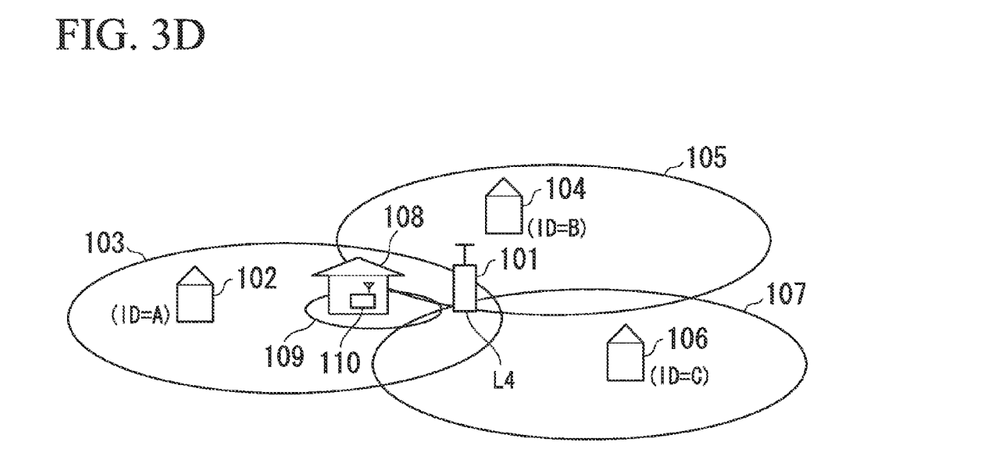
FIG. 3D is a diagram explaining a process at each location when the mobile terminal is moved in the wireless communication system in accordance with the first exemplary embodiment of the present invention.

In contrast, as shown in FIG. 3D, if the mobile terminal 101 reaches a location L4 in the vicinity of the femtocell 109 (a location which is out of the range of the femtocell 109 and is in the ranges of the macrocell 103, the macrocell 105, and the macrocell 107), the mobile terminal 101 receives the cell ID (ID=A) of the macrocell 103, the cell ID (ID=B) of the macrocell 105, and the cell ID (ID=C) of the macrocell 107. In this case, the cell IDs stored in the cell ID information storage unit 253 (ID=A, ID=B, and ID=C) (see FIG. 4B) exactly agree with the received cell IDs (ID=A, ID=B, and ID=C).

Having confirmed the exact agreement between the cell IDs stored in the cell ID information storage unit 253 and the received cell IDs, the mobile terminal 101 performs a cell search process for the femtocell 109. If the femtocell 109 providing the satisfactory communication quality has been detected as a result of the cell search, the mobile terminal 101 performs an inter-cell movement process toward the femtocell 109, and registers the location with the femtocell 109.

As a result, if the mobile terminal 101 approaches the vicinity of the femtocell 109, a cell search for the femtocell 109 is performed. Therefore, after that time, the mobile terminal 101 can be moved to the femtocell 109 smoothly without transition to the state in which the mobile terminal 101 is out of range.

It is to be noted that a description have been given for the case in which the foregoing processing presets, as a cell search condition, the condition that cell ID information stored in the cell ID information storage unit 253 exactly agrees with the received cell IDs, and performs a cell search process for the femtocell 109 only if this cell search condition is satisfied. However, the cell search condition is not restricted to such a condition. For example, in addition to the condition described above that the respective cell IDs of the macrocell 103, the macrocell 105, and the macrocell 107 exactly agree with the cell IDs stored in the cell ID information storage unit 253 in the mobile terminal 101, a conceivable cell search condition is the case in which received cell ID agrees with part of the cell IDs stored in the cell ID information storage unit 253.

Moreover, since the cell search process results in power consumption by the mobile terminal 101, the cell search condition may be set to any condition depending on the power consumption performance of the mobile terminal 101.

Furthermore, the miniature base station 110, which forms the femtocell 109 to be searched for, is deployed in the house 108 of the user, and information required for a cell search such as frequencies, base station identification codes such as scrambling codes are known. Therefore, these pieces of information may be maintained in the mobile terminal 101 in advance. Alternatively, a menu that makes it possible to edit information on a cell that is to be searched for through a user's operation may be provided in the mobile terminal 101 so that a particular cell can be set as a target for search. By doing so, it is possible to start up a cell search for a femtocell based on cell IDs, even if information on femtocells are not registered in neighboring cell information on macrocells.

Next, a detailed operation of the wireless communication system in accordance with the present exemplary embodiment will be described.

Figure 5:
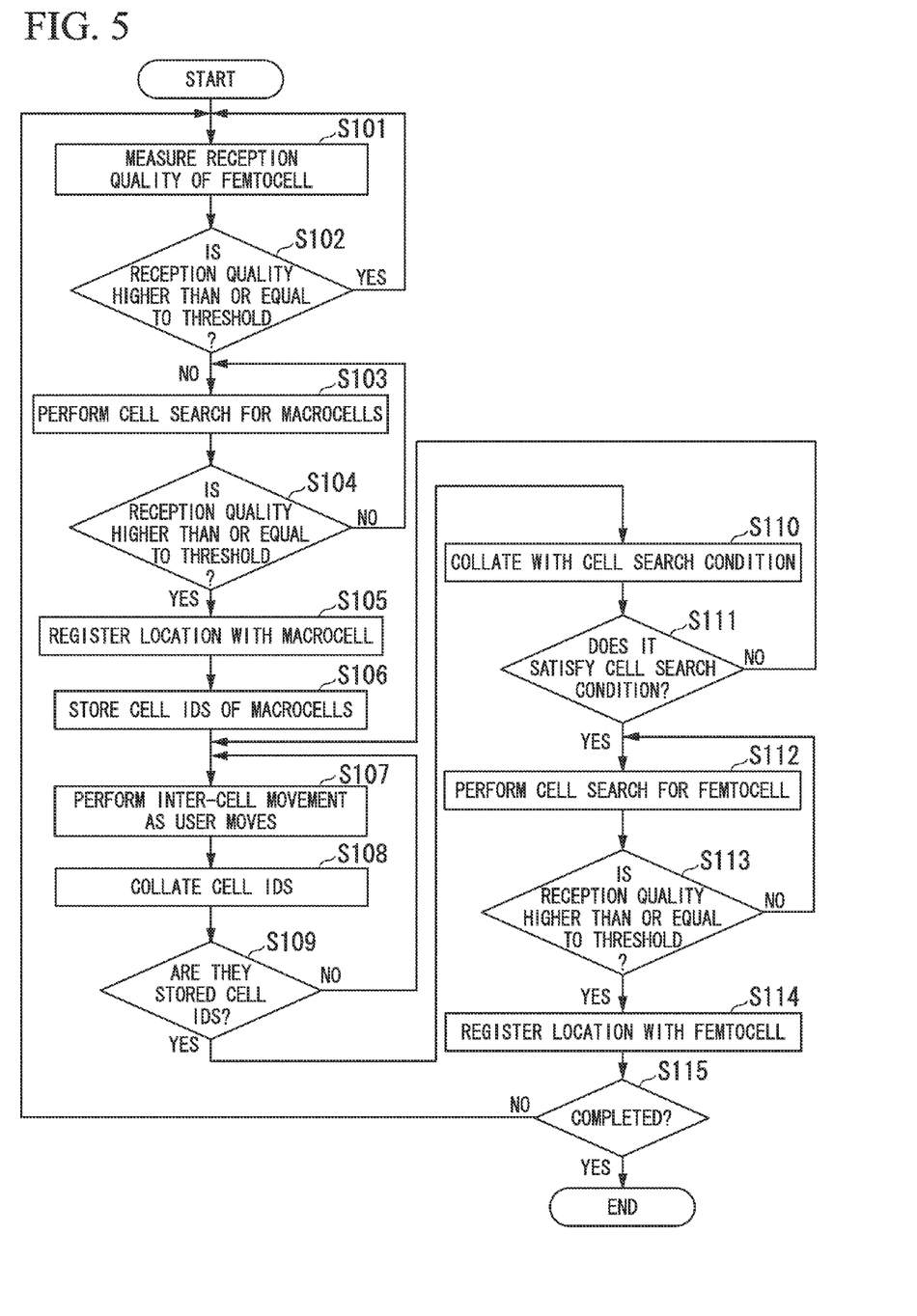
FIG. 5 is a flowchart that is used for explaining the operation of the wireless communication system in accordance with the first exemplary embodiment of the present invention.

FIG. 5 is a flowchart which is used for explaining the operation of the wireless communication system in accordance with the first exemplary embodiment of the present invention.

If the mobile terminal 101 is present in the range of a femtocell after start-up, the cell search function unit 251 of the mobile terminal 101 measures the reception quality of the femtocell (step S101). Subsequently, the cell search function unit 251 determines whether or not the reception quality is higher than or equal to a threshold (step S102). If the cell search function unit 251 has determined that the reception quality is higher than or equal to the threshold (step S102: YES), the processing returns to step S101, and the cell search function unit 251 measures the reception quality of the femtocell again. In contrast, if the cell search function unit 251 has determined that the reception quality is lower than the threshold (step S102: NO), the cell search function unit 251 performs a cell search for macrocells (step S103).

The cell search function unit 251 determines whether or not the reception quality is higher than or equal to the threshold for at least one of the macrocells detected as a result of the cell search (step S104). If the cell search function unit 251 has determined that the reception quality is not higher than or equal to the threshold for all the detected macrocells (step S104: NO), the processing returns to step S103, and the cell search function unit 251 performs a cell search for macrocells again. In contrast, if the cell search function unit 251 has determined that the reception quality is higher than or equal to the threshold for at least one of the detected macrocells (step S104: YES), the cell search function unit 251 registers the location with a macrocell for which the reception quality is highest among the detected macrocells (step S105). Subsequently, the cell ID detection function unit 252 receives cell IDs from the respective detected macrocells, transmits the received cell IDs of the macrocells to the control unit 202, and the control unit 202 stores the transmitted cell IDs in the cell ID information storage unit 253 provided in the mobile terminal 101 (step S106).

Thereafter, if an inter-cell movement is performed as the user moves (step S107), the cell search function unit 251 executes a cell search to search for macrocells. The cell ID detection function unit 252 receives cell IDs from the searched macrocells. Subsequently, the cell ID comparison function unit 254 collates the cell IDs. That is, the cell ID comparison function unit 254 checks whether or not the cell IDs stored in the cell ID information storage unit 253 agree with the cell IDs received by the cell ID detection function unit 252 (step S108).

If the cell ID comparison function unit 254 has determined that the cell IDs stored in the cell ID information storage unit 253 do not agree with the cell IDs received by the cell ID detection function unit 252 as a result of the collation of the cell IDs (step S109: NO), the processing returns to step S107, and the cell search function unit 251, the cell ID detection function unit 252, and the cell ID comparison function unit 254 again perform searching of macrocells, reception of cell IDs, and collation, respectively. In contrast, if the cell ID comparison function unit 254 has determined that the cell IDs stored in the cell ID information storage unit 253 agree with the cell IDs received by the cell ID detection function unit 252 (step S109: YES), the cell ID comparison function unit 254 collates the received cell IDs with the cell search condition to confirm whether the received cell IDs satisfy the cell search condition (step S110). Herein, as described above, the cell search condition indicates the condition of performing a cell search for a femtocell. For example, as the cell search condition, there are the condition that the cell ID information stored in the cell ID information storage unit 253 exactly agrees with the received cell IDs, the condition that the received cell IDs agree with at least part of the cell ID information stored in the cell ID information storage unit 253, or the like.

If the received cell IDs do not satisfy the cell search condition (step S111: NO), the processing returns to step S107, and searching for macrocells, reception of cell IDs, and collation are performed again. In contrast, if the received cell IDs satisfy the cell search condition (step S111: YES; in the example of FIG. 3A to FIG. 3D described above, if there is exact agreement with respect to the three cell IDs of the macrocell 103, the macrocell 105, and the macrocell 107), the cell search function unit 251 determines that the mobile terminal 101 has been moved in the vicinity of a femtocell, and incorporates a cell search for a femtocell in addition to a neighboring cell search for macrocells. By doing so, the cell search function unit 251 performs a cell search for a femtocell (step S112). The cell search function unit 251 then determines whether or not the reception quality of the femtocell is higher than or equal to the threshold (step S113). If the cell search function unit 251 has determined that the reception quality of the femtocell is not higher than or equal to the threshold (step S113: NO), the processing returns to step S112, and the cell search function unit 251 executes a cell search for a femtocell again. In contrast, if the cell search function unit 251 has determined that the reception quality of the femtocell is higher than or equal to the threshold (step S113: YES), the cell search function unit 251 registers the location with this femtocell (step S114).

Subsequently, the mobile terminal 101 determines whether or not completion of the processing is instructed through an operation by the user or the like (step S115). If the mobile terminal 101 has determined that the completion of the processing is not instructed (step S115: NO), the processing returns to step S101, and the cell search function unit 251 measures the reception quality of the femtocell. In contrast, if the mobile terminal 101 has determined that the completion of the processing is instructed (step S115: YES), the processing is completed.

As described above, in the first exemplary embodiment of the present invention, upon movement to the location L2 in the vicinity of the boundary, which is in the vicinity of the femtocell and is out of the range of the femtocell, the mobile terminal 101 receives report information from neighboring macrocells (macro base stations), and stores cell IDs of the macrocells included in the report information, which has been received successfully, in the cell ID information storage unit 253. After having stored the cell IDs in the cell ID information storage unit 253, whenever the mobile terminal 101 undergoes an inter-cell movement as the user moves, the mobile terminal 101 collates the cell IDs stored in the cell ID information storage unit 253 with the received cell IDs to perform a process of checking agreement or disagreement of the cell IDs. If the cell IDs stored in the cell ID information storage unit 253 agree with the received cell IDs, the mobile terminal 101 searches for the femtocell 109. By doing so as described above, movement to a femtocell is possible without transition to the state in which the mobile terminal 101 is out of range.

Second Exemplary Embodiment

A second exemplary embodiment of the present invention is basically the same as the first exemplary embodiment, but employs IEEE 802.15.1 (Bluetooth (registered trademark)), which is a representative of short distance communications, as a method for detecting a femtocell. By doing so, the present invention is also applicable to the case in which an attempt is made to improve the power consumption performance of the mobile terminal.

IEEE 802.15.1 (Bluetooth (registered trade mark)) is a function provided in mobile terminals in these days as a short distance communication, and femtocells can be detected even if such a short distance communication is employed. Methods for detecting a femtocell in accordance with the related art always start up short distance communications, thereby causing a problem in that the power consumption performance of mobile terminals is deteriorated. In contrast, in the present exemplary embodiment, cell IDs are detected, agreement or disagreement of the cell IDs is checked, and short distance communications are controlled such that the short distance communications are started up only if a cell search condition, such as one in which the cell IDs agree with each other, is satisfied. That is, the cell search function unit 251 performs a cell search for a femtocell using short distance communications in step S112 of FIG. 5. By doing so, it is not necessary to always start up short distance communications, and thus it is possible to avoid the above-described problem of deteriorating the power consumption performance of a mobile terminal.

As a result, it is possible to realize movement to a femtocell without deteriorating the power consumption performance of a mobile terminal even if the femtocell is detected using the short distance communications.

While the present invention has been particularly shown and described with reference to exemplary embodiments thereof, the present invention is not limited to these exemplary embodiments. It will be understood by those of ordinary skill in the art that various changes in form and details may be made therein without departing from the spirit and scope of the present invention as defined by the claims.

The above-described mobile terminal 101 includes a computer system therein. Then, the operations of the respective processing units described above are stored in a computer-readable recording medium in the form of a program, and a computer reads and executes this program, thereby performing the above processing. Herein, the computer-readable recording medium refers to a magnetic disc, a magneto-optical disc, a CD (Compact Disc)-ROM (Read Only Memory), a DVD (Digital Versatile Disc)-ROM, a semiconductor memory, or the like. In addition, this computer program may be distributed to a computer via a communication line, and the computer, which undergoes the distribution, may execute this program.

Moreover, the above program may be one for realizing part of the above-described functions. Furthermore, it may be a so-called differential file (a differential program) that can realize the above-described functions through a combination with a program that is already recorded in the computer system.

This application is based upon and claims the benefit of priority from Japanese patent application No. 2009-277557, filed on Dec. 7, 2009, the disclosure of which is incorporated herein in its entirety by reference.

INDUSTRIAL APPLICABILITY

The present invention is applicable to, for example, wireless communication systems that include femtocells. In accordance with the present invention, movement to a femtocell is possible without transition to the state in which a mobile terminal is out of range. As a result, even if, for example, a user moves from a macrocell to a femtocell during communications using a mobile terminal, the communications are not interrupted and it is possible to maintain satisfactory communications.

EXPLANATION OF REFERENCE NUMERALS

101 . . . mobile terminal
102, 104, 106 . . . base station
103, 105, 107 . . . macrocell
108 . . . house
109 . . . femtocell
110 . . . miniature base station
201 . . . communication unit
202 . . . control unit (control means)
251 . . . cell search function unit (macrocell search means, femtocell search means)
252 . . . cell ID detection function unit (cell ID detection means)
253 . . . cell ID information storage unit (cell ID information storage means)
254 . . . cell ID comparison function unit (cell ID comparison means)

The invention claimed is:

1. A mobile terminal comprising:
a macrocell search unit which searches for a macro base station with which the mobile terminal itself is capable of communicating, the mobile terminal itself communicating with a macro base station which forms a macrocell or a femto base station which forms a femtocell;
a cell identifier (ID) detection unit which receives report information from the macro base station searched by the macrocell search unit and detects a cell ID of the macro base station;
a cell ID information storage unit which stores cell IDs of macro base stations;
a cell ID comparison unit which compares the cell IDs stored in the cell ID information storage unit with the cell ID detected by the cell ID detection unit;
a control unit which, when reception quality from a femto base station that the mobile terminal is present in the range thereof is lower than a predetermined threshold, directs the macrocell search unit to search for the macro base station with which the mobile terminal itself is capable of communicating, directs the cell ID detection unit to detect the cell ID, stores the detected cell ID in the cell ID information storage unit, and, whenever the mobile terminal undergoes an inter-cell movement, directs the macrocell search unit to search for a macro base station with which the mobile terminal having undergone inter-cell movement is presently capable of communicating, directs the cell ID detection unit to detect a cell ID of the macro base station with which the mobile terminal having undergone inter-cell movement is capable of communicating, and directs the cell ID comparison unit to compare the stored cell IDs and the detected cell ID; and
a femtocell search unit which performs a cell search for the femto base station when the cell IDs stored in the cell ID information storage unit at least partly agree with the detected cell ID based on a comparison result between the cell IDs stored in the cell ID information storage unit and the detected cell ID.

2. The mobile terminal according to claim 1, wherein the femtocell search unit performs the cell search of the femto base station only when a cell search condition is satisfied which is a condition for determining whether to perform the cell search of the femto base station, based on the cell IDs stored in the cell ID information storage unit and the detected cell ID.

3. The mobile terminal according to claim 2, wherein the cell search condition is a condition which indicates that the cell search of the femto base station is performed when a cell ID stored in the cell ID information storage unit exactly agrees with the detected cell ID.

4. The mobile terminal according to claim 3, wherein when a cell ID stored in the cell ID information storage unit agrees with the detected cell ID, the femtocell search unit starts a short distance communication and performs the cell search of the femto base station using the short distance communication.

5. The mobile terminal according to claim 2, wherein the cell search condition is set depending on power consumption performance of the mobile terminal.

6. The mobile terminal according to claim 5, wherein when a cell ID stored in the cell ID information storage unit agrees with the detected cell ID, the femtocell search unit starts a short distance communication and performs the cell search of the femto base station using the short distance communication.

7. The mobile terminal according to claim 2, wherein when a cell ID stored in the cell ID information storage unit agrees with the detected cell ID, the femtocell search unit starts a short distance communication and performs the cell search of the femto base station using the short distance communication.

8. The mobile terminal according to claim 1, wherein when one of the cell IDs stored in the cell ID information storage unit agrees with the detected cell ID, the femtocell search unit starts a short distance communication and performs the cell search of the femto base station using the short distance communication.

9. A wireless communication system, comprising:
   a mobile terminal which communicates with a macro base station which forms a macrocell or a femto base station which forms a femtocell, the mobile terminal comprising:
   a macrocell search unit which searches for a macro base station with which the mobile terminal is capable of communicating;
   a cell ID detection unit which receives report information from the macro base station searched by the macrocell search unit and detects a cell ID of the macro base station;
   a cell ID information storage unit which stores cell IDs of macro base stations;
   a cell ID comparison unit which compares the cell IDs stored in the cell ID information storage unit with the cell ID detected by the cell ID detection unit;
   a control unit which, when reception quality from a femto base station that the mobile terminal is present in the range thereof is lower than a predetermined threshold, directs the macrocell search unit to search for the macro base station with which the mobile terminal itself is capable of communicating, directs the cell ID detection unit to detect the cell ID, stores the detected cell ID in the cell ID information storage unit, and, whenever the mobile terminal undergoes an inter-cell movement, directs the macrocell search unit to search for a macro base station with which the mobile terminal having undergone inter-cell movement is presently capable of communicating, directs the cell ID detection unit to detect a cell ID of the macro base station with which the mobile terminal having undergone inter-cell movement is capable of communicating, and directs the cell ID comparison unit to compare the stored cell IDs and the detected cell ID; and
   a femtocell search unit which performs a cell search for the femto base station when the cell IDs stored in the cell ID information storage unit at least partly agree with the detected cell ID based on a comparison result between the cell IDs stored in the cell ID information storage unit and the detected cell ID.

* * * * *